United States Patent
Terry et al.

(10) Patent No.: US 11,026,287 B2
(45) Date of Patent: *Jun. 1, 2021

(54) METHOD AND APPARATUS FOR SELECTIVELY ENABLING RECEPTION OF DOWNLINK SIGNALING CHANNELS

(71) Applicant: INTERDIGITAL TECHNOLOGY CORPORATION, Wilmington, DE (US)

(72) Inventors: Stephen E. Terry, Northport, NY (US); Guodong Zhang, Woodbury, NY (US); Stephen G. Dick, Nesconset, NY (US)

(73) Assignee: INTERDIGITAL TECHNOLOGY CORPORATION, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,315

(22) Filed: Jul. 29, 2019

(65) Prior Publication Data

US 2020/0029387 A1    Jan. 23, 2020

Related U.S. Application Data

(63) Continuation of application No. 15/824,278, filed on Nov. 28, 2017, now Pat. No. 10,368,389, which is a
(Continued)

(51) Int. Cl.
*H04W 76/28* (2018.01)
*H04W 72/12* (2009.01)
(Continued)

(52) U.S. Cl.
CPC ........... *H04W 76/28* (2018.02); *H04L 1/1812* (2013.01); *H04W 52/0216* (2013.01);
(Continued)

(58) Field of Classification Search
None
See application file for complete search history.

(56) References Cited

U.S. PATENT DOCUMENTS 5,517,679 A   5/1996 Yahagi
5,960,352 A   9/1999 Cherpantier
(Continued)

FOREIGN PATENT DOCUMENTS

EP   1 180 907   2/2002
EP   1 282 276   2/2003
(Continued)

OTHER PUBLICATIONS

Lucent Technologies, "Enhancing the Uplink DCH—Adaptive Modulation and Coding," 3GPP TSG-RAN1 #29, R1-02-1435 (Nov. 5-8, 2002).
(Continued)

*Primary Examiner* — Eunsook Choi
(74) *Attorney, Agent, or Firm* — Volpe Koenig

(57) ABSTRACT

A wireless transmit/receive unit (WTRU) is disclosed that comprises a processor configured to selectively enable and disable reception of downlink signaling and configured to monitor a buffer of the WTRU for data to transmit. The WTRU comprises a transmitter configured to transmit, while reception of the downlink signaling is disabled, a channel allocation request in response to data in the monitored buffer. The processor is configured, in response to the data in the monitored buffer, to enable reception of the downlink signaling to allow the WTRU to receive an uplink channel allocation. The transmitter is configured, in response to the WTRU receiving an uplink channel allocation, to transmit uplink data on an uplink channel. The processor is configured to track a time when HARQ feedback is expected to be received in response to the transmitted uplink data, and
(Continued)

configured to receive the HARQ feedback at the expected time.

18 Claims, 3 Drawing Sheets

Related U.S. Application Data continuation of application No. 14/871,130, filed on Sep. 30, 2015, now Pat. No. 9,867,228, which is a continuation of application No. 14/063,430, filed on Oct. 25, 2013, now abandoned, which is a continuation of application No. 11/095,401, filed on Mar. 31, 2005, now Pat. No. 8,570,952.

(60) Provisional application No. 60/566,620, filed on Apr. 29, 2004.

(51) Int. Cl.
| | |
|---|---|
| H04W 88/02 | (2009.01) |
| H04W 52/02 | (2009.01) |
| H04L 1/18 | (2006.01) |
| H04W 72/04 | (2009.01) |
| H04L 1/16 | (2006.01) |
| H04W 8/24 | (2009.01) |
| H04W 24/10 | (2009.01) |
| H04W 74/00 | (2009.01) |
| H04W 84/04 | (2009.01) |
| H04W 88/08 | (2009.01) |

(52) U.S. Cl.
CPC ... *H04W 52/0219* (2013.01); *H04W 72/0453* (2013.01); *H04W 72/1278* (2013.01); *H04W 88/02* (2013.01); *H04L 1/16* (2013.01); *H04W 8/24* (2013.01); *H04W 24/10* (2013.01); *H04W 72/0413* (2013.01); *H04W 74/00* (2013.01); *H04W 84/042* (2013.01); *H04W 88/08* (2013.01); *Y02B 70/30* (2013.01); *Y02D 30/70* (2020.08)

(56) References Cited

U.S. PATENT DOCUMENTS

| | | | |
|---|---|---|---|
| 6,122,516 A | 9/2000 | Thompson et al. | |
| 6,181,716 B1 | 1/2001 | Lide | |
| 6,473,411 B1 | 10/2002 | Kumaki et al. | |
| 6,678,523 B1 | 1/2004 | Ghosh et al. | |
| 6,711,180 B1 | 3/2004 | Delesalle et al. | |
| 6,987,982 B2 | 1/2006 | Willenegger et al. | |
| 7,079,485 B1 | 7/2006 | Lau et al. | |
| 7,127,256 B2 | 10/2006 | Terry et al. | |
| 7,206,332 B2 | 4/2007 | Kwan et al. | |
| 7,319,718 B2 | 1/2008 | Roh et al. | |
| 7,346,035 B2 | 3/2008 | Lee et al. | |
| 10,159,071 B2 * | 12/2018 | Park | H04W 72/042 |
| 2002/0009999 A1 * | 1/2002 | Lee | H04L 1/1896 |
| | | | 455/454 |
| 2002/0172163 A1 | 11/2002 | Chen et al. | |
| 2002/0172208 A1 * | 11/2002 | Malkamaki | H04L 1/1607 |
| | | | 370/400 |
| 2002/0196766 A1 * | 12/2002 | Hwang | H04W 52/56 |
| | | | 370/342 |
| 2003/0039270 A1 | 2/2003 | Chang et al. | |
| 2003/0108027 A1 | 6/2003 | Kim et al. | |
| 2003/0207691 A1 | 11/2003 | Chen | |
| 2003/0219037 A1 | 11/2003 | Toskala et al. | |
| 2003/0223452 A1 | 12/2003 | Toskala et al. | |
| 2003/0227869 A1 | 12/2003 | Hsu et al. | |
| 2003/0227882 A1 | 12/2003 | Czaja et al. | |
| 2004/0001459 A1 | 1/2004 | Chandhok et al. | |
| 2004/0120286 A1 | 6/2004 | Schwarz | |
| 2004/0147262 A1 | 7/2004 | Lescuyer et al. | |
| 2004/0192308 A1 * | 9/2004 | Lee | H04L 1/1803 |
| | | | 455/436 |
| 2004/0208160 A1 * | 10/2004 | Petrovic | H04L 1/1835 |
| | | | 370/350 |
| 2005/0054358 A1 | 3/2005 | Zhang et al. | |
| 2005/0078629 A1 | 4/2005 | Bi et al. | |
| 2005/0083943 A1 | 4/2005 | Lee et al. | |
| 2005/0111358 A1 | 5/2005 | Hsu et al. | |
| 2007/0091852 A1 | 4/2007 | Malladi et al. | |
| 2007/0127369 A1 | 6/2007 | Sebire | |
| 2007/0140258 A1 | 6/2007 | Tan et al. | |
| 2007/0165575 A1 * | 7/2007 | Niwano | H04W 72/1268 |
| | | | 370/335 |

FOREIGN PATENT DOCUMENTS

| | | |
|---|---|---|
| JP | 2002-261372 | 9/2002 |
| JP | 2003-061261 | 2/2003 |
| WO | 95/032567 | 11/1995 |
| WO | 02/089503 | 11/2002 |
| WO | 02/093776 | 11/2002 |
| WO | 03/065739 | 8/2003 |
| WO | 04/006603 | 1/2004 |
| WO | 04/034656 | 4/2004 |

OTHER PUBLICATIONS

Lucent Technologies, "Enhancing the Uplink DSCH—Scheduling Options," 3GPP TSG-RAN1 #29, R1-02-1322 (Nov. 5-8, 2002).
Motorola et al., "Enhanced Uplink Dedicated Transport Channel," 3GPP RAN1 #31, Tdoc# R1-03-0359 (Feb. 18-21, 2003).
Motorola, "AH64: Uplink HARQ Schemes and SHO considerations," 3GPPRAN1#30, Tdoc# R1-030068 (Jan. 7-11, 2003).
Motorola, "Enhanced Uplink Dedicated Transport Channel," 3GPPRAN1#30, Tdoc# R1030069, San Diego, USA (Jan. 7-11, 2003).
Qualcomm Europe, "Example of Rel-99 TFC control algorithm," 3GPP TSG-RAN1 #34, R1-031004, Seoul, Korea (Oct. 6-10, 2003).
Qualcomm, "Channel Structure for Consideration in Enhanced Uplink," 3GPP TSG RAN WG1 #31,Tdoc R1-03-0273 (Feb. 18-21, 2003).
Third Generation Partnership Project, "Technical Specification Group Radio Access Network; Radio Resource Control (RRC); Protocol Specification (Release 5)," 3GPP TS 25.331 V5.12.1 (Mar. 2005).
Third Generation Partnership Project, "Technical Specification Group Radio Access Network; Feasibility Study for Enhanced Uplink for UTRA FDD (Release 6)," 3GPP TR 25.896 V2.0.0 (Mar. 2004). (See, in particular, Chapter 7.1 on pp. 17-19, Chapter 7.1.2.5.1 on p. 24 and Chapter 8.2 on pp. 38-39).
Third Generation Partnership Project, "Technical Specification Group Radio Access Network; FDD Enhanced Uplink; Overall Description; Stage 2 (Release 6)," 3GPP TS 25.309 V6.2.0 (Mar. 2005).
Third Generation Partnership Project, "Technical Specification Group Radio Access Network; Medium Access Control (MAC) Protocol Specification (Release 1999)," 3GPP TS 25.321 v3.16.0 (Sep. 2003).
Third Generation Partnership Project, "Technical Specification Group Radio Access Network; Medium Access Control (MAC) Protocol Specification (Release 1999)," 3GPP TS 25.321 v3.17.0 (Jun. 2004).
Third Generation Partnership Project, "Technical Specification Group Radio Access Network; Medium Access Control (MAC) Protocol Specification (Release 4)," 3GPP TS 25.321 v4.9.0 (Sep. 2003).
Third Generation Partnership Project, "Technical Specification Group Radio Access Network; Medium Access Control (MAC) Protocol Specification (Release 4)," 3GPP TS 25.321 v4.10.0 (Jun. 2004).
Third Generation Partnership Project, "Technical Specification Group Radio Access Network; Medium Access Control (MAC) Protocol Specification (Release 5)," 3GPP TS 25.321 v5.8.0 (Mar. 2004).
Third Generation Partnership Project, "Technical Specification Group Radio Access Network; Medium Access Control (MAC) Protocol Specification (Release 5)," 3GPP TS 25.321 v5.10.0 (Dec. 2004).

(56) References Cited

OTHER PUBLICATIONS

Third Generation Partnership Project, "Technical Specification Group Radio Access Network; Medium Access Control (MAC) Protocol Specification (Release 6)," 3GPP TS 25.321 v6.1.0 (Mar. 2004).
Third Generation Partnership Project, "Technical Specification Group Radio Access Network; Medium Access Control (MAC) Protocol Specification (Release 6)," 3GPP TS 25.321 v6.4.0 (Mar. 2005).
Third Generation Partnership Project, "Technical Specification Group Radio Access Network; Feasibility Study for Enhanced Uplink for UTRA FDD (Release 6)," 3GPP TR 25.896 V6.0.0 (Mar. 2004).
Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).
Third Generation Partnership Project, "Technical Specification Group Radio Access Network; Physical channels and mapping of transport channels onto physical channels (FDD) (Release 4)," 3GPP TS 25.211 V4.6.0 (Sep. 2002).
Third Generation Partnership Project, "Technical Specification Group Radio Access Network; Physical channels and mapping of transport channels onto physical channels (FDD) (Release 5)," 3GPP TS 25.211 V5.5.0 (Sep. 2003).
Third Generation Partnership Project, "Technical Specification Group Radio Access Network; Physical channels and mapping of transport channels onto physical channels (FDD) (Release 5)," 3GPP TS 25.211 V5.6.0 (Sep. 2004).
Third Generation Partnership Project, "Technical Specification Group Radio Access Network; Physical channels and mapping of transport channels onto physical channels (FDD) (Release 6)," 3GPP TS 25.211 V6.0.0 (Dec. 2003).
Third Generation Partnership Project, "Technical Specification Group Radio Access Network; Physical channels and mapping of transport channels onto physical channels (FDD) (Release 6)," 3GPP TS 25.211 V6.4.0 (Mar. 2005).
Third Generation Partnership Project, "Technical Specification Group Radio Access Network; Physical layer procedures (FDD) (Release 1999)," 3GPP TS 25.214 V3.12.0 (Mar. 2003).
Third Generation Partnership Project, "Technical Specification Group Radio Access Network; Physical layer procedures (FDD) (Release 4)," 3GPP TS 25.214 V4.6.0 (Mar. 2003).
Third Generation Partnership Project, "Technical Specification Group Radio Access Network; Physical layer procedures (FDD) (Release 5)," 3GPP TS 25.214 V5.8.0 (Mar. 2004).
Third Generation Partnership Project, "Technical Specification Group Radio Access Network; Physical layer procedures (FDD) (Release 5)," 3GPP TS 25.214 V5.10.0 (Dec. 2004).
Third Generation Partnership Project, "Technical Specification Group Radio Access Network; Physical layer procedures (FDD) (Release 6)," 3GPP TS 25.214 V6.1.0 (Mar. 2004).
Third Generation Partnership Project, "Technical Specification Group Radio Access Network; Physical layer procedures (FDD) (Release 6)," 3GPP TS 25.214 V6.5.0 (Mar. 2005).
Third Generation Partnership Project, "Technical Specification Group Radio Access Network; Radio Resource Control (RRC) protocol specification (Release 1999)," 3GPP TS 25.331 V3.18.0 (Mar. 2004).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC); Protocol Specification (Release 4)," 3GPP TS 25.331 V4.13.0 (Mar. 2004).
Third Generation Partnership Project, "Technical Specification Group Radio Access Network; Radio Resource Control (RRC); Protocol Specification (Release 4)," 3GPP TS 25.331 V4.17.0 (Mar. 2005).
Third Generation Partnership Project, "Technical Specification Group Radio Access Network; Radio Resource Control (RRC); Protocol Specification (Release 5)," 3GPP TS 25.331 V5.8.0 (Mar. 2004).
Third Generation Partnership Project, "Technical Specification Group Radio Access Network; Radio Resource Control (RRC);Protocol Specification (Release 6)," 3GPP TS 25.331 V6.1.0 (Mar. 2004).
Third Generation Partnership Project, "Technical Specification Group Radio Access Network; Radio Resource Control (RRC); Protocol Specification (Release 6)," 3GPP TS 25.331 V6.5.0 (Mar. 2005).
Third Generation Partnership Project, "Technical Specification Group Radio Access Network; Terminal power saving features (Release 4)," 3GPP TR 25.840 V4.0.0 (Dec. 2003).

* cited by examiner

METHOD AND APPARATUS FOR SELECTIVELY ENABLING RECEPTION OF DOWNLINK SIGNALING CHANNELS

CROSS REFERENCE TO RELATED APPLICATIONS

This application is a continuation of U.S. patent application Ser. No. 15/824,278 filed Nov. 28, 2017, which is a continuation of U.S. patent application Ser. No. 14/871,130 filed Sep. 30, 2015, now U.S. Pat. No. 9,867,288 which issued on Jan. 9, 2018, which is a continuation of U.S. patent application Ser. No. 14/063,430, filed Oct. 25, 2013, which is abandoned, which is a continuation of U.S. patent application Ser. No. 11/095,401, filed Mar. 31, 2005, which issued on Oct. 29, 2013 as U.S. Pat. No. 8,570,952, which claims the benefit of U.S. Provisional Application No. 60/566,620 filed Apr. 29, 2004, which are incorporated by reference as if fully set forth.

FIELD OF INVENTION

The present invention is related to a wireless communication system including a wireless transmit/receive unit (WTRU) and at least one Node-B. More particularly, the present invention is a method and apparatus for selectively enabling reception of downlink (DL) enhanced uplink (EU) signaling channels established between the WTRU and the Node-B(s).

BACKGROUND

Methods for improving uplink (UL) coverage, throughput and transmission latency are being investigated in Release 6 (R6) of the 3rd Generation Partnership Project (3GPP). In order to successfully implement these methods, the scheduling and assigning of UL radio resources have been moved from a radio network controller (RNC) to a Node-B such that the Node-B can make decisions and manage UL radio resources on a short-term basis more efficiently than the RNC, even if the RNC retains overall control over the Node-B.

EU operation requires transmitting information such as UL channel allocations and transmission feedback information to the WTRU via DL EU signaling channels. The WTRU monitors the DL EU signaling channels for the reception of channel allocations and transmission feedback information.

A method and apparatus is desired for controlling reception of the DL EU signaling channels such that they are enabled only when required.

SUMMARY

The present invention is a method and apparatus for selectively enabling reception of at least one DL EU signaling channel used for EU operation. During the operation of an enhanced dedicated channel (E-DCH), a WTRU monitors at least one DL EU signaling channel established between the WTRU and at least one Node-B only when it is necessary, based on the WTRU's knowledge of at least one established standard procedure. The WTRU coordinates and consolidates DL signaling channel reception requirements of a plurality of channel allocation and/or data transmission procedures carried out by the WTRU in accordance with the established standard procedure. The WTRU determines whether to enable reception of at least one specific DL signaling channel based on the consolidated DL signaling channel reception requirements.

In accordance with the present invention, the WTRU does not have to continuously enable the reception of the DL EU signaling channel during EU operation. Instead, the WTRU may selectively turn on and off, (i.e., enable and disable), reception of at least one specific DL EU signaling channel, thus reducing WTRU processing requirements and reducing the probability of misinterpretation of DL signaling.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENT(S)

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
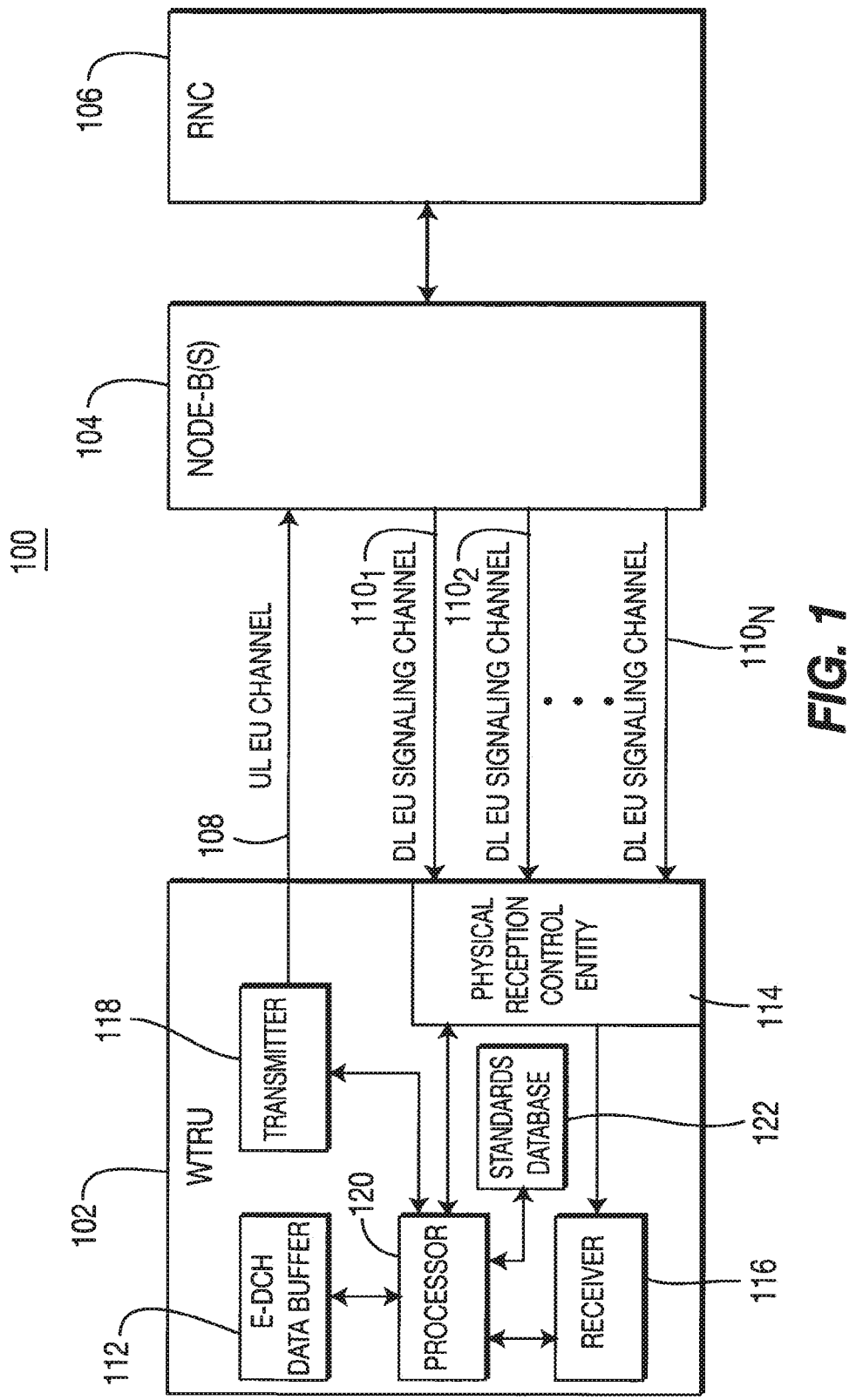
FIG. 1 is a block diagram of a wireless communication system operating in accordance with the present invention.

FIG. 1 is a block diagram of a wireless communication system 100 operating in accordance with the present invention. The system 100 includes a WTRU 102, at least one Node-B 104 and an RNC 106. The WTRU 102 includes an E-DCH data buffer 112, a physical reception control entity 114, a receiver 116, a transmitter 118, a processor 120 and a standards database 122.

The transmitter 118 in the WTRU 102 transmits an EU channel allocation request, (i.e., a rate request), to the Node-B(s) 104 through a UL EU channel 108 for EU transmission to the Node-B 104. The EU channel allocation request may include scheduling information. The scheduling information may include traffic volume measurement (TVM) information of E-DCH data stored in the buffer 112 of the WTRU 102 and available EU transmit power information.

After the EU channel allocation request is transmitted, the receiver 116 in the WTRU 102 monitors a plurality of DL EU signaling channels $110_1$, $110_2$, ..., $110_N$ for channel allocation information via the physical reception control entity 114. The Node-B(s) 104 responds to the EU channel allocation request with UL channel allocation information through one of the DL EU signaling channels $110_{1-N}$.

The system 100 is configured such that both UL signaling and E-DCH data are transmitted from the WTRU 102 to the Node-B(s) 104 via the UL EU channel 108. After receiving scheduling information for channel allocation from the Node-B(s) 104 through at least one of the DL EU signaling channels $110_{1-N}$, the transmitter 118 in the WTRU 102 transmits E-DCH data through the allocated UL EU channel 108. The receiver 116 in the WTRU 102 then monitors the DL EU signaling channel(s) $110_{1-N}$ for expected E-DCH data feedback information.

In response to receiving the E-DCH data, the Node-B(s) 104 transmits E-DCH data feedback information to the WTRU 102 through the DL EU signaling channels $110_{1-N}$. The feedback information includes either a positive acknowledgement (ACK) message or a negative acknowledgement (NACK) message, depending on the success or failure of the Node-B(s) 104 decoding the E-DCH data sent over the UL EU channel 108 by the WTRU 102. The Node-B(s) 104 may also transmit further channel allocation information in response to the E-DCH data transmission. Such further information may be included in the feedback information or may be sent as a separate transmission over the DL EU signaling channels $110_{1-N}$.

The status of active EU procedures in the WTRU 102 may be used to provide input to the physical reception control entity 114 of the WTRU 102. The physical reception control entity 114 communicates with a physical layer process to selectively enable and disable reception of the DL EU signaling channels $110_{1-N}$.

In accordance with the present invention, the physical reception control entity 114 in the WTRU 102 disables reception, (i.e., ceases monitoring), of the DL EU signaling channels 1101-N when it is not required by EU signaling procedures known to the WTRU 102. During periods when the WTRU 102 is not required to receive the DL EU signaling channels $110_{1-N}$, the processing requirements and power consumption of the WTRU 102 are reduced, and the possibility of false interpretation of DL signaling is avoided.

Figure 2:
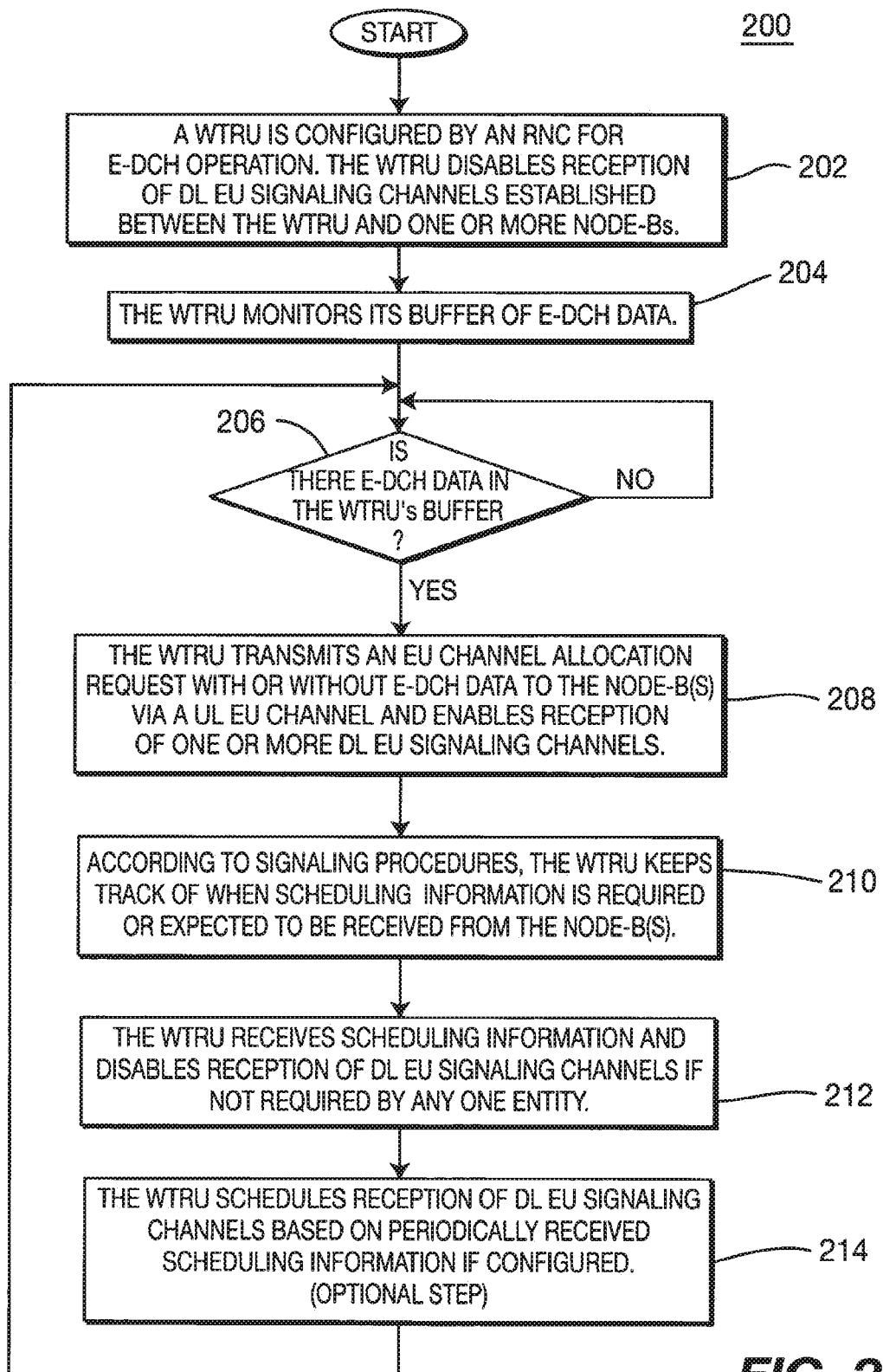
FIG. 2 is a flow diagram of a process including method steps for selectively enabling reception of at least one DL EU signaling channel during EU operation when the WTRU sends an EU channel allocation request and is expecting to receive scheduling information in accordance with one embodiment of the present invention.

FIG. 2 is a flow diagram of a process 200 including method steps for selectively enabling reception of at least one DL EU signaling channel $110_{1-N}$ during EU transmission in accordance with the present invention. In step 202, the WTRU 102 is configured by the RNC 106 for E-DCH operation, whereby the UL EU channel 108 and the DL EU signaling channel(s) $110_{1-N}$ are established between the WTRU 102 and the Node-B(s) 104. The WTRU 102 is not required to enable the reception of its DL EU signaling channel(s) $110_{1-N}$ immediately following configuration in the WTRU 102. Thus, the physical reception control entity 114 in the WTRU 102 disables reception of DL EU signal channel(s) $110_{1-N}$.

Still referring to FIG. 2, after the WTRU 102 is configured for E-DCH operation at step 202, the WTRU 102 monitors its buffer 112 of E-DCH data (step 204). If, at step 206, it is determined by the WTRU 102 that there is no E-DCH data in the buffer 112, the WTRU 102 continues to monitor the buffer 112, and reception of the DL EU signaling channels $110_{1-N}$ remains disabled at step 204. If, at step 206, it is determined by the WTRU 102 that there is E-DCH data waiting (i.e., queued) for transmission via the UL EU channel 108, the WTRU 102 transmits an EU channel allocation request with or without E-DCH data to the Node-B(s) 104 via the UL EU channel 108 and enables reception of at least one DL EU signaling channel $110_{1-N}$ (step 208). The WTRU 102 may optionally enable reception of DL EU signaling channel(s) $110_{1-N}$ after a predetermined or calculated delay. The EU channel allocation request may include scheduling information such as TVM information and available EU transmit power information.

Operation of E-DCH requires radio resource allocations to be scheduled and signaled by the Node-B(s) 104 to the WTRU 102 in response to an EU channel allocation request transmitted by the WTRU 102. According to established signaling procedures, the WTRU 102 keeps track of when E-DCH data transmission scheduling information including EU channel allocations is required or expected to be received from the Node-B(s) on at least one DL EU signaling channel $110_{1-N}$ based on information indicating when the EU channel allocation request was transmitted by the WTRU 102 (step 210).

In step 212, the WTRU 102 receives the required or expected scheduling information from the Node-B(s) over the DL EU signaling channel(s) $110_{1-N}$ and then, if not required by any one entity, the physical reception control entity 114 disables reception of DL EU signaling channel(s) $110_{1-N}$. Optionally, in step 214, the WTRU 102 schedules reception of DL EU signaling channel(s) $110_{1-N}$ based on periodically received DL EU signaling channel scheduling information if configured. Reception of specific DL EU signaling channel(s) $110_{1-N}$ is enabled, depending on which EU signaling procedures are active in the WTRU 102.

Figure 3:
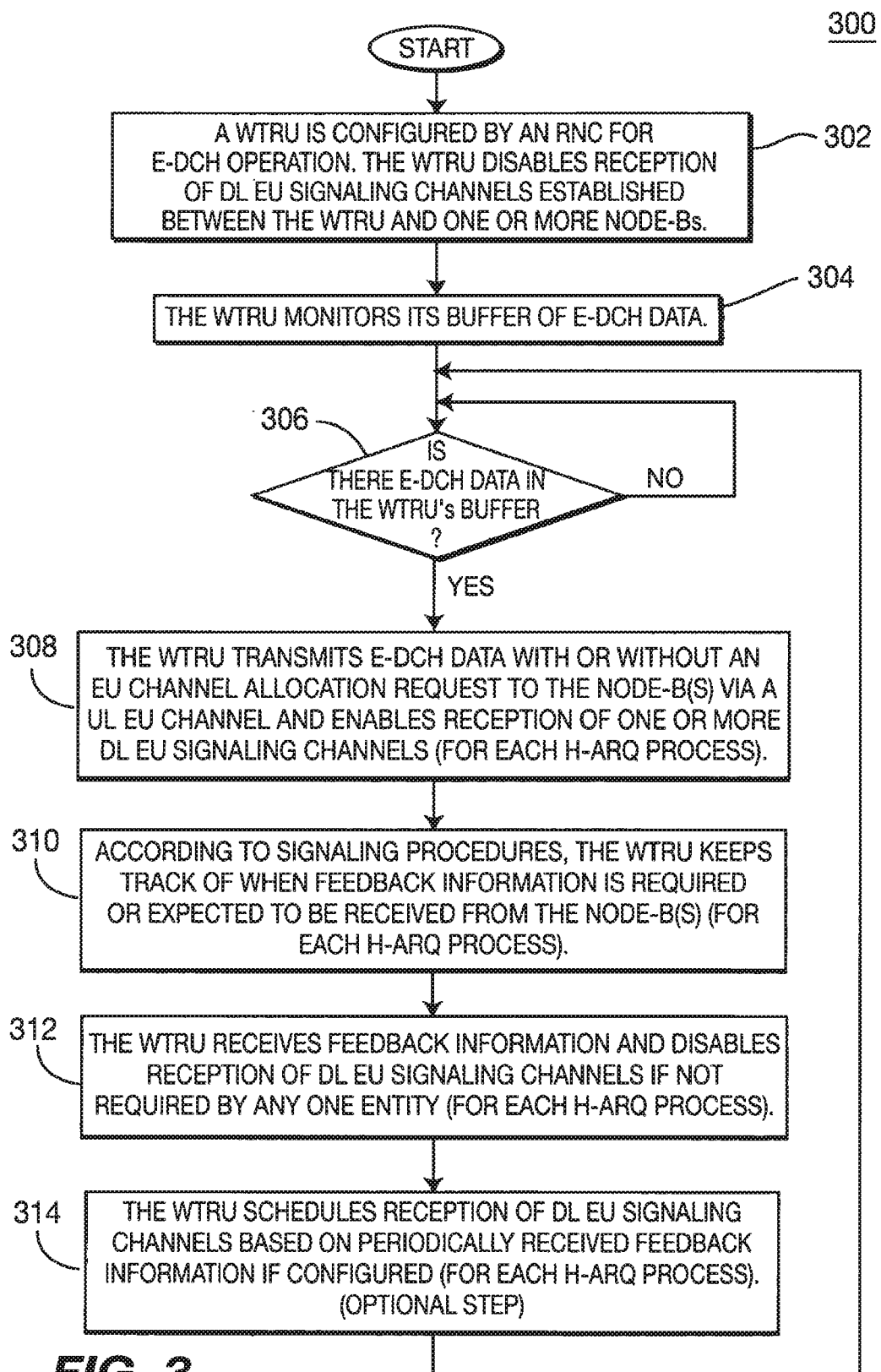
FIG. 3 is a flow diagram of a process including method steps for selectively enabling reception of at least one DL EU signaling channel when the WTRU sends E-DCH data and is expecting to receive feedback information in accordance with another embodiment of the present invention.

FIG. 3 is a flow diagram of a process 300 including method steps for selectively enabling reception of the DL EU signaling channels $110_{1-N}$ when the WTRU 102 sends E-DCH data and is expecting to receive feedback information in accordance with another embodiment of the present invention. In step 302, the WTRU 102 is configured by the RNC 106 for E-DCH operation whereby the UL EU channel 108 and the DL EU signaling channel(s) $110_{1-N}$ are established between the WTRU 102 and the Node-B(s) 104. The WTRU 102 is not required to enable the reception of its DL EU signaling channel(s) $110_{1-N}$ immediately following the E-DCH operation configuration of the WTRU 102. Thus, the physical reception control entity 114 in the WTRU 102 disables reception of DL EU signal channel(s) $110_{1-N}$.

Still referring to FIG. 3, after the WTRU 102 is configured to perform an E-DCH operation at step 302, the WTRU 102 monitors its buffer 112 of E-DCH data (step 304). If at step 306 it is determined by the WTRU 102 that there is no E-DCH data in the buffer 112, the WTRU 102 continues to monitor the buffer 112, and reception of the DL EU signaling channel(s) $110_{1-N}$ remains disabled at step 304.

Steps 308, 310, 312 and 314 of process 300 may be performed for each of a plurality of several hybrid-automatic repeat request (H-ARQ) processes operating in parallel in the WTRU. If at step 306 it is determined by the WTRU 102 that there is E-DCH data waiting (i.e., queued) for transmission via the UL EU channel 108, for each H-ARQ process, the WTRU 102 transmits E-DCH data with or without an EU channel allocation request to the Node-B(s) 104 via the UL EU channel 108 and enables reception of DL EU signaling channel(s) $110_{1-N}$ (step 308). The WTRU 102 may optionally enable reception of DL EU signaling channel(s) $110_{1-N}$ after a predetermined or calculated delay.

According to established signaling procedures, the WTRU 102 keeps track of when feedback information is required or expected to be received from the Node-B(s) 104 for each H-ARQ process (step 310). In step 312, the WTRU receives feedback information from the Node-B(s) 104 and disables reception of the DL EU signaling channel(s) $110_{1-N}$ if not required by any one entity. Optionally, in step 314, the WTRU 102 schedules reception of the DL EU signaling channel(s) $110_{1-N}$ based on periodically received feedback information if configured. Reception of specific DL EU signaling channel(s) $110_{1-N}$ is enabled, depending on which EU signaling procedures are active in the WTRU 102.

The WTRU 102 keeps track of when scheduling information including EU channel allocations is expected to be received on DL EU signaling channels $110_{1-N}$ based on information indicating when the WTRU 102 transmitted the E-DCH data. DL EU signaling channels $110_{1-N}$ are also used to provide the WTRU 102 feedback information from the Node-B(s) 104 for E-DCH transmissions. Since feedback transmitted to the WTRU is in response to a specific action of the WTRU, the time of feedback information reception at the WTRU can be accurately determined by the WTRU. Feedback information transmitted by the Node-B(s) 104 via the DL EU signaling channel(s) $110_{1-N}$ may consist of H-ARQ acknowledgements and/or UL channel allocation information. One example of WTRU reception of feedback channels could be H-ARQ information channels (HICHs) and relative grant channels (RGCHs) or absolute grant channels (AGCH) in 3GPP.

The H-ARQ operation may be either synchronous or asynchronous. In synchronous operation, the WTRU 102 knows exactly when the WTRU 102 may receive the feedback (ACK or NACK) via DL EU signaling channel(s) $110_{1-N}$ and the WTRU 102 enables reception of the DL EU signaling channel(s) $110_{1-N}$ in accordance with a preconfigured schedule. With asynchronous H-ARQ operation, the WTRU enables reception of the DL EU signaling channel(s) $110_{1-N}$ for a predetermined time period following the EU transmission for receiving the feedback.

Channel allocation feedback may also be transmitted to the WTRU 102 from the Node-B(s) 104 on DL EU signaling channel(s) $110_{1-N}$. The WTRU 102 may also enable reception of DL EU signaling channel(s) $110_{1-N}$ for this channel allocation feedback information. EU channel allocation procedures known to the WTRU 102 allow the WTRU 102 to schedule reception of this information. The channel allocation feedback may either be synchronized with the H-ARQ feedback, send over a predetermined period, or have a specified periodic repetition that the WTRU 102 can schedule reception for.

If the WTRU 102 does not send a channel allocation request to the Node-B(s) 104, but all previous EU data transmission requests sent by the WTRU 102 have been serviced by the Node-B(s) 104, and feedback information was received from the Node-B for all outstanding H-ARQ transmissions, then the WTRU 102 disables the reception of the DL EU signaling channel(s) $110_{1-N}$.

In one embodiment, the WTRU 102 sends at least one channel allocation request to a plurality of Node-Bs 104 via at least one UL channel 108, and the Node-Bs send channel allocation information to the WTRU 102 via respective downlink (DL) signaling channels $110_{1-N}$ in response to receiving the channel allocation request.

The processor 120 in the WTRU 102 coordinates and consolidates DL signaling channel reception requirements of a plurality of channel allocation procedures carried out by the WTRU 102 in accordance with at least one established standard procedure stored in the standards database 122, and determines whether or not to enable reception of specific ones of the DL signaling channels $110_{1-N}$ based on the consolidated DL signaling channel reception requirements. The standards database 120 is in communication with the processor 120 and provides the processor 120 with information associated with at least one established standard procedure. The transmitter 118 is in communication with the processor 120 and sends at least one channel allocation request to the Node-Bs 104 via at least one UL channel 108.

The receiver 116 is in communication with the processor 120 and receives channel allocation information from the Node-Bs 104 over the DL signaling channels $110_{1-N}$. The physical reception control entity 114 is in communication with the processor 120 and the receiver 116. The physical reception control entity 114 enables or disables reception of specific ones of the DL signaling channels $110_{1-N}$ based on the determination made by the processor 120.

In another embodiment, the WTRU 102 sends at least one data transmission to a plurality of Node-Bs 104 via at least one UL channel 108, and the Node-Bs 104 send data transmission feedback information to the WTRU 102 via respective downlink (DL) signaling channels $110_{1-N}$ in response to receiving the data transmission.

The processor 120 in the WTRU 102 coordinates and consolidates DL signaling channel reception requirements of a plurality of data transmission procedures carried out by the WTRU in accordance with at least one established standard procedure stored in the standards database 122, and determines whether or not to enable reception of specific ones of the DL signaling channels $110_{1-N}$ based on the consolidated DL signaling channel reception requirements. The E-DCH data buffer 112 is in communication with the processor 120 and queues data to be included in at least one data transmission sent by the WTRU 102 to the Node-Bs 104 via at least one UL channel 108. The transmitter 118 is in communication with the processor and sends the at least one data transmission to the Node-Bs 104. The receiver 116 is in communication with the processor 120 and receives data transmission feedback information from the Node-Bs 104 over the DL signaling channels $110_{1-N}$. The physical reception control entity 114 is in communication with the processor 120 and the receiver 116. The physical reception control entity 114 enables or disables reception of specific ones of the DL signaling channels $110_{1-N}$ based on the determination made by the processor 120.

In yet another embodiment, the WTRU 102 sends at least one channel allocation request and E-DCH data to a plurality of Node-Bs 104 via at least one UL channel 108, and the Node-Bs send channel allocation information and data feedback information associated with the E-DCH data to the WTRU 102 via respective downlink (DL) signaling channels $110_{1-N}$ in response to receiving the at least one channel allocation request and E-DCH data.

The processor 120 in the WTRU 102 coordinates and consolidates DL signaling channel reception requirements of a plurality of channel allocation procedures and data transmission procedures carried out by the WTRU 102 in accordance with at least one established standard procedure stored in the standards database 122, and determines whether or not to enable reception of specific ones of the DL signaling channels $110_{1-N}$ based on the consolidated DL signaling channel reception requirements. The standards database 120 is in communication with the processor 120 and provides the processor 120 with information associated with at least one established standard procedure. The transmitter 118 is in communication with the processor 120 and sends at least one channel allocation request and E-DCH data to the Node-Bs 104 via at least one UL channel 108. The receiver 116 is in communication with the processor 120 and receives channel allocation information from the Node-Bs 104 over the DL signaling channels $110_{1-N}$. The physical reception control entity 114 is in communication with the processor 120 and the receiver 116. The physical reception control entity 114 enables or disables reception of specific ones of the DL signaling channels $110_{1-N}$ based on the determination made by the processor 120.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A wireless transmit/receive unit (WTRU) comprising:
a transmitter;
a receiver; and
a processor, wherein:
the processor is configured to enable and disable reception of downlink signaling;
the transmitter is configured to, while reception of the downlink signaling is disabled, transmit an uplink channel allocation request in response to data in a buffer of the WTRU;
the processor is further configured to, in response to having transmitted the uplink channel allocation request, enable reception of the downlink signaling to allow the WTRU to receive uplink channel allocation information;
the receiver is configured to receive uplink channel allocation information; and
the transmitter is further configured to, in response to the WTRU receiving the uplink channel allocation information, transmit uplink data on an uplink channel.

2. The WTRU of claim 1, wherein the processor is further configured to:
track a time when hybrid automatic repeat request (HARQ) feedback is expected to be received in response to the transmitted uplink data; and
receive the HARQ feedback at the expected time.

3. The WTRU of claim 2, wherein the processor is further configured to enable reception of the downlink signaling during the expected time when the HARQ feedback is expected to be received.

4. The WTRU of claim 1, wherein the downlink signaling is received over at least one downlink channel.

5. The WTRU of claim 1, wherein the uplink channel allocation request is transmitted without user data.

6. The WTRU of claim 1, wherein the uplink data is transmitted using asynchronous hybrid automatic repeat request (HARQ).

7. The WTRU of claim 1, wherein the processor is further configured to establish the downlink signaling with a base station, and disable reception of the downlink signaling from at least a time of establishing the downlink signaling with the base station until at least a time the uplink channel allocation request is transmitted by the WTRU.

8. The WTRU of claim 7, wherein the processor is further configured to monitor the buffer from the time of establishing the downlink signaling with the base station until at least the time the uplink channel allocation request is transmitted by the WTRU.

9. The WTRU of claim 1, wherein the processor is further configured to track a time when the uplink channel allocation information is expected to be received on the downlink signaling based on a transmission time of the uplink channel allocation request; and
the processor is further configured to enable reception of the downlink signaling during the time when the uplink channel allocation information is expected to be received on the downlink signaling.

10. A method implemented by a wireless transmit/receive unit (WTRU), the method comprising:
enabling or disabling reception of downlink signaling;
transmitting, while reception of the downlink signaling is disabled, an uplink channel allocation request in response to data in a buffer of the WTRU;
in response to having transmitted the uplink channel allocation request, enabling reception of the downlink signaling to allow the WTRU to receive uplink channel allocation information;
receiving uplink channel allocation information; and
in response to the WTRU receiving the uplink channel allocation information, transmitting uplink data on an uplink channel.

11. The method of claim 10 further comprising:
tracking a time when hybrid automatic repeat request (HARQ) feedback is expected to be received in response to the transmitted uplink data; and
receiving the HARQ feedback at the expected time.

12. The method of claim 11 further comprising enabling reception of the downlink signaling during the expected time when the HARQ feedback is expected to be received.

13. The method of claim 10, wherein the downlink signaling is received over at least one downlink channel.

14. The method of claim 10, wherein the uplink channel allocation request is transmitted without user data.

15. The method of claim 10, wherein the uplink data is transmitted using asynchronous hybrid automatic repeat request (HARQ).

16. The method of claim 10, further comprising:
establishing the downlink signaling with a base station; and
disabling reception of the downlink signaling from at least a time of establishing the downlink signaling with the base station until at least a time the uplink channel allocation request is transmitted by the WTRU.

17. The method of claim 16, further comprising:
monitoring the buffer from the time of establishing the downlink signaling with the base station until at least the time the uplink channel allocation request is transmitted by the WTRU.

18. The method of claim 10, further comprising:
tracking a time when the uplink channel allocation information is expected to be received on the downlink signaling based on a transmission time of the uplink channel allocation request; and
enabling reception of the downlink signaling during the time when the uplink channel allocation information is expected to be received on the downlink signaling.

* * * * *